United States Patent [19]

Rayboy

[11] 4,141,218
[45] Feb. 27, 1979

[54] BUOYANCY OPERATED SUNMILL

[76] Inventor: Eric R. Rayboy, Apartment #J-215, 11273 N. Kendall Dr., Miami, Fla. 33176

[21] Appl. No.: 854,461

[22] Filed: Nov. 23, 1977

[51] Int. Cl.² ............................................. F03G 7/02
[52] U.S. Cl. ........................................ 60/641; 60/496
[58] Field of Search ............... 60/496, 530, 531, 641, 60/675

[56] References Cited

U.S. PATENT DOCUMENTS

| 3,715,885 | 2/1973 | Schur | 60/496 |
| 4,028,893 | 6/1977 | Shaw | 60/641 |

Primary Examiner—Allen M. Ostrager
Assistant Examiner—Stephen F. Husar
Attorney, Agent, or Firm—Sanford J. Asman

[57] ABSTRACT

A sun-powered engine converts the heat of the sun's rays into mechanical energy which can be used to power a generator or other mechanism having a rotating shaft. The engine, called the "Sunmill" by its inventor, uses heat expanded trapped bubbles to provide buoyancy to vanes contained within a sealed drum thereby causing the drum to rotate. A shaft attached to the axis of the drum is used to transfer power to other devices, such as an electric generator.

7 Claims, 2 Drawing Figures

BUOYANCY OPERATED SUNMILL

BACKGROUND OF THE INVENTION

The present invention relates to a sun-powered engine called the "Sunmill" by its inventor.

Heretofore, a number of sun-powered engines have been described. Many of those engines utilize rotating mechanisms which are unbalanced by the boiling of a volatile fluid. For example, such an engine is described in U.S. Pat. No. 389,515 issued Sept. 11, 1888 to A. Iske. Other similar engines are described in U.S. Pat. No. 3,509,716 issued on May 5, 1970 to E. N. Avery and in U.S. Pat. No. 3,984,985 issued on Oct. 12, 1976 to J. M. Lapeyre.

Motors propelled by buoyancy have heretofore been described in U.S. Pat. No. 3,715,885 issued on Feb. 13, 1973 to G. O. Shur and in U.S. Pat. No. 3,938,964 issued on Jan. 27, 1976 to D. Diamond.

In view of the interest in energy conservation and in the utilization of non-fossil fuels and the particular interest which exists in the utilization of solar power, an improved apparatus for converting solar energy into mechanical energy, such as the Sunmill, is desired.

DETAILED DESCRIPTION OF THE INVENTION

Figure 1:
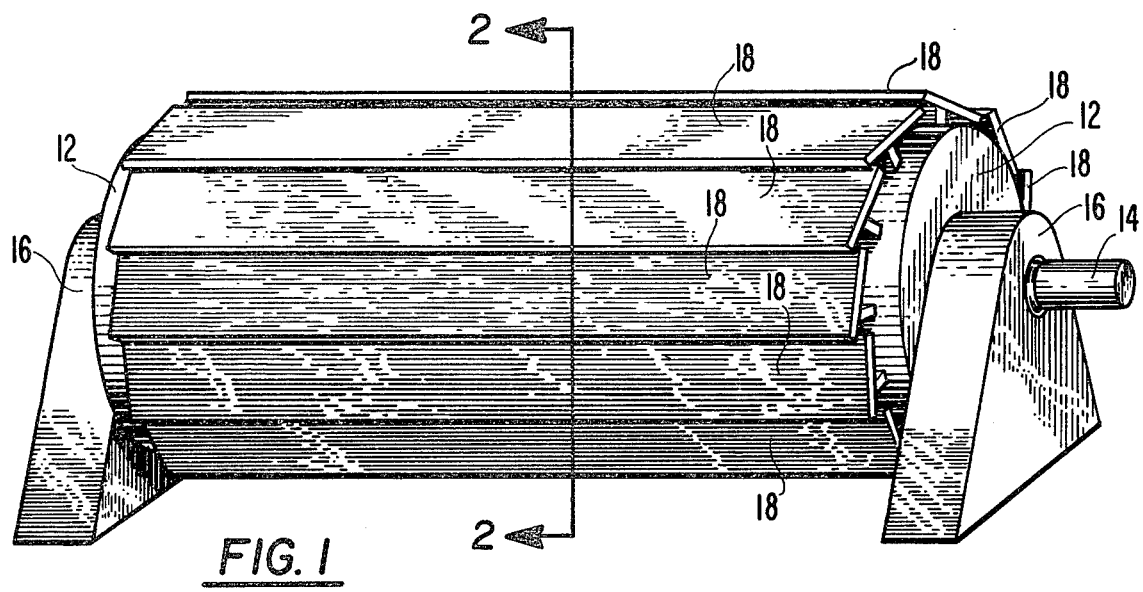
FIG. 1 is a perspective view of the Sunmill with its shade portion removed.

Referring generally to FIG. 1, a perspective view of a Sunmill 10 with is shade removed for clarity, is shown. The Sunmill 10 is comprised of a rotating drum 12 having a shaft 14 which extends through the longitudinal axis of the drum 12. The shaft 14 extends through a pair of support members 16 located at either end of the drum 12. The support members 16 include bearings (not shown) which allow the shaft 14 to rotate freely within the support members 16.

In operation, the drum 12 rotates for reasons which will be explained hereinafter. The rotating drum 12 causes the shaft 14 to rotate. Devices, including, but not limited to, electric generators or water pumps, may be driven by the rotating shaft 14 as will be obvious to one of ordinary skill in the art.

With continued reference to FIG. 1, the external portions of the drum 12 include a series of overlapping, heat conductive heat sinks 18, made of a material such as copper or aluminum, which are designed to receive radiant energy from the sun and to transfer such energy, in the form of heat, into the drum 12 where it will cause rotation of the drum 12 in the manner which is to be explained hereinafter.

Figure 2:
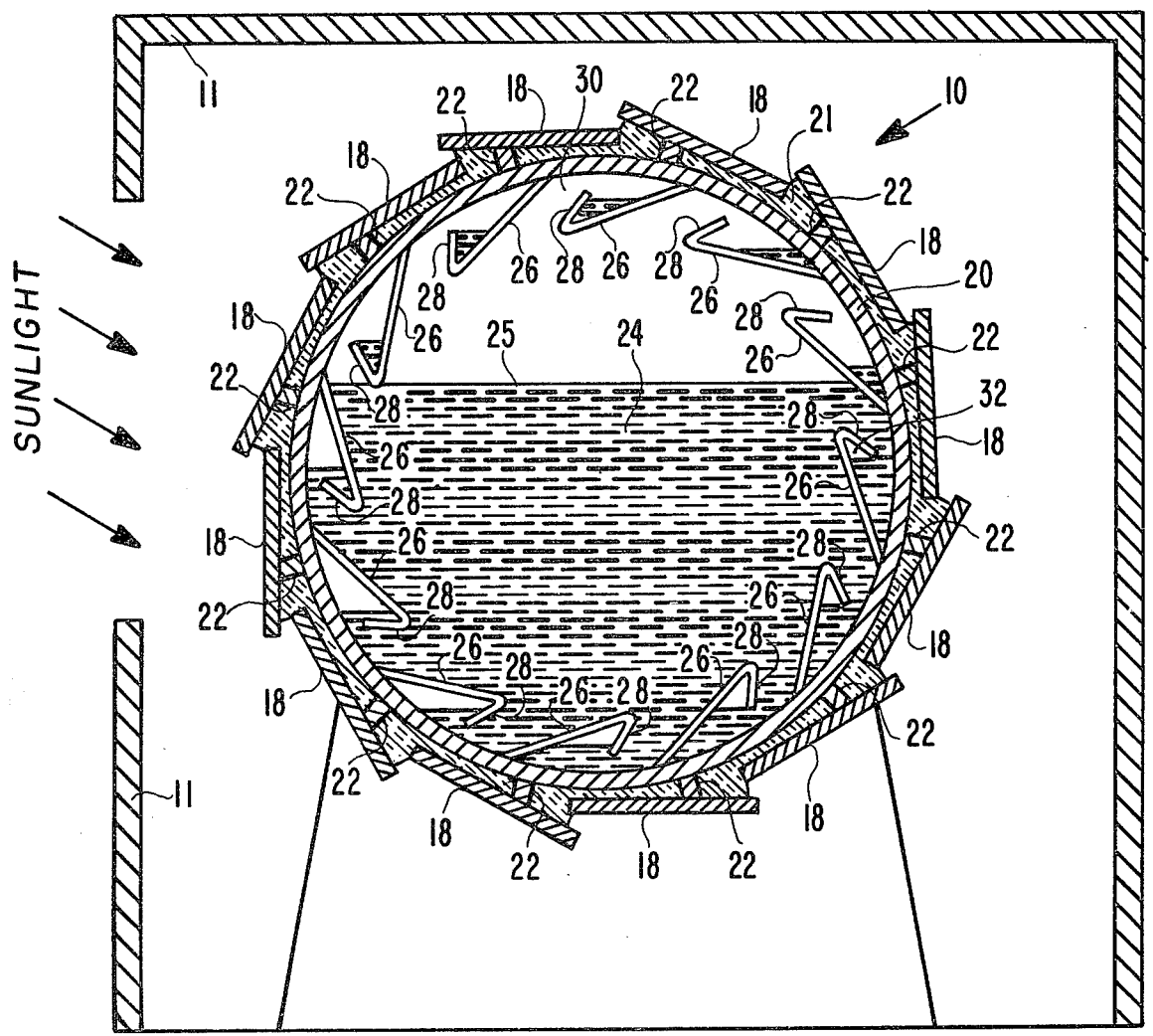
FIG. 2 is a cross-sectional view of the Sunmill taken along the lines 2—2 of FIG. 1 and including the shade portion absent in FIG. 1.

With reference to FIG. 2, a cross-section of the drum 12 taken along the lines 2—2 of FIG. 1 is shown. The cross-section also includes a shade 11 not shown in FIG. 1. As shown, the drum 12 comprises the heat sinks 18 which are attached to and spaced from an inner wall 20 by means of retaining and spacing members 22, which members 22 are also used to transfer heat from the heat sinks 18 to the inner wall 20. Between the retaining and spacing members 22 and the inner wall 20 there is an insulating material 21, such as an injectable foam, which prevents heat from flowing to all parts of the inner wall 20.

The inner wall 20 of the drum 12 provides a sealed vessel in which a fluid 24 having an upper surface 25, is contained. The inner wall 20 is made of a heat conductive material, such as copper or aluminum, as are the retaining and spacing members 22.

The particular fluid 24 used in the Sunmill 10 is not important. However, water is used in the preferred embodiment of the invention. Above the surface 25 of the fluid 24, there is a gas containing chamber 30, formed by the inner wall 20 and the surface 25, which contains a gas, such as air which is used in the preferred embodiment of the invention.

A series of heat conductive vanes 26, also made of a heat conductive material, such as copper or aluminum, are attached to the inner wall 20 at a small angle, as shown in FIG. 2. The vanes 26 extend into the drum 12, and each vane 26 has a hooked portion 28 which bends back toward the inner wall 20 as shown. As the drum 12 rotates in a clockwise direction, as shown in FIG. 2, the vanes 26 rise above the surface 25 of the fluid 24 where the hooked portions 28 capture some of the gas contained in the chamber 30. Accordingly, as a vane 26 descends below the surface 25 of the fluid 24 a gas bubble 32 is trapped in the hooked portion 28 of the vane 26. As the drum 12 continues to rotate in a clockwise direction, sunlight (represented by the series of arrows in FIG. 2) heats the heat sinks 18 which are exposed to the sunlight through the opening in the shade 11 thereby transmitting heat from the heat sinks 18 through the retaining and spacing members 22 and thence to the inner wall 20, thereby heating the gas bubble 32 and causing it to expand and consequently displace more of the fluid 24. In addition, as the drum 12 rotates, the gas bubble 32 is transferred from the hooked portion 28 to the main portion of the vane 26 thereby providing greater room for expansion.

After the Sunmill 10 has operated for a period of time, the gas contained in the chamber 30 will warm up. Accordingly, as the vanes 26 rotate, they will capture warm, expanded air which will cool and contract as the vanes 26 become submerged. As a result, the cooled gas will contract making the vanes 26 less buoyant as they are submerged, thereby adding to the effect produced by the Sunmill 10. In the preferred embodiment of the invention, the heat sinks 18 overlap one another in order to prevent the inner wall 20 from receiving direct sunlight and overheating. Sunlight is allowed to strike the heat sinks 18 only when they are between about the 7 o'clock and 10 o'clock positions as shown in FIG. 2. The sunlight can be directed or concentrated by using mirrors or concentrating lenses as will be obvious to one having skill in the art.

The torque generated by a Sunmill 10 is determined by an expanding pocket of gas 32. Accordingly, the torque may be increased by increasing the diameter of the drum 12 or by increasing the length of the drum 12. It has been found by the inventor that it may be necessary to rotate the drum 12 at least one revolution after it has been filled and sealed before the Sunmill 10 is operational. The rotation insures that all of the vanes 26 contain some gas and that the drum 12 is at a neutral equilibrium.

While the gas and fluid may be selected as required for different applications, the inventor has found that water is a suitable fluid and that air is a suitable gas for use in his Sunmill 10. Accordingly, the Sunmill 10 provides a non-polluting source of power which draws energy from free sunlight and which is capable of almost maintenance-free operation and which can be constructed from readily available materials.

I claim:

1. A sun-powered engine comprising:
   (a) a sealed, cylindrical drum having a shaft extending from each end along its longitudinal axis, said drum containing a gas and a fluid;
   (b) a pair of support members rotably supporting each end of said drum and allowing said drum to rotate about its longitudinal axis;
   (c) a plurality of vanes extending from the cylindrical wall of said drum into the interior of said drum, each vane being fixed to said cylindrical wall at an acute angle in the direction in which said drum is intended to rotate, there being a hooked portion at the interior end of each of said vanes, said hooked portion being adapted to capture some of said gas as the hooked portions of said vanes transit from said gas into said fluid with the rotation of said drum; and
   (d) means for heating said gas held by selected ones of said vanes whereby the heated gas will expand displacing some of said fluid thereby causing said selected ones of said vanes to become more buoyant than others of said vanes whereby said drum will rotate.

2. The sun-powered engine of claim 1 wherein said means comprises heat sinks exterior to and mounted on said cylindrical wall.

3. The sun-powered engine of claim 2 further comprising retaining and spacing members associated with each of said vanes and heat sinks, there being a like number of each, for spacing said heat sinks from the cylindrical wall of said drum and attaching said heat sinks to said wall.

4. The sun-powered engine of claim 3 further comprising bearings for rotatably supporting said shaft, said bearings being held by said support members.

5. The sun-powered engine of claim 4 wherein said means further comprises a sun shade having an opening therein for selectively admitting sunlight.

6. The sun-powered engine of claim 5 wherein said gas is air.

7. The sun-powered engine of claim 6 wherein said fluid is water.

* * * * *